Figure 3:
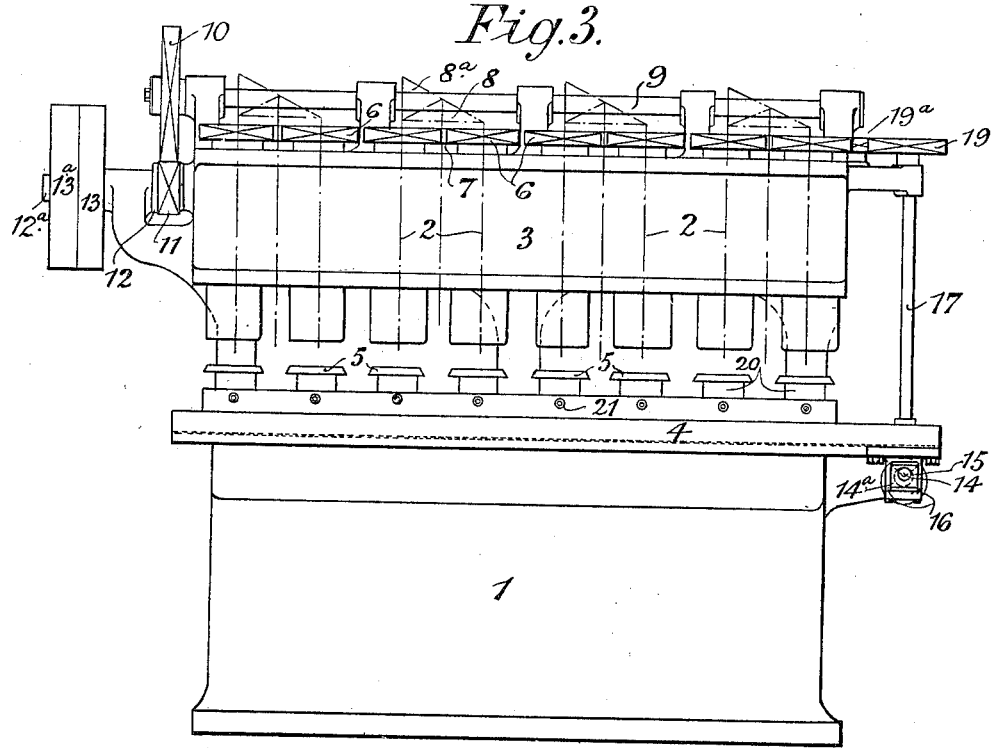

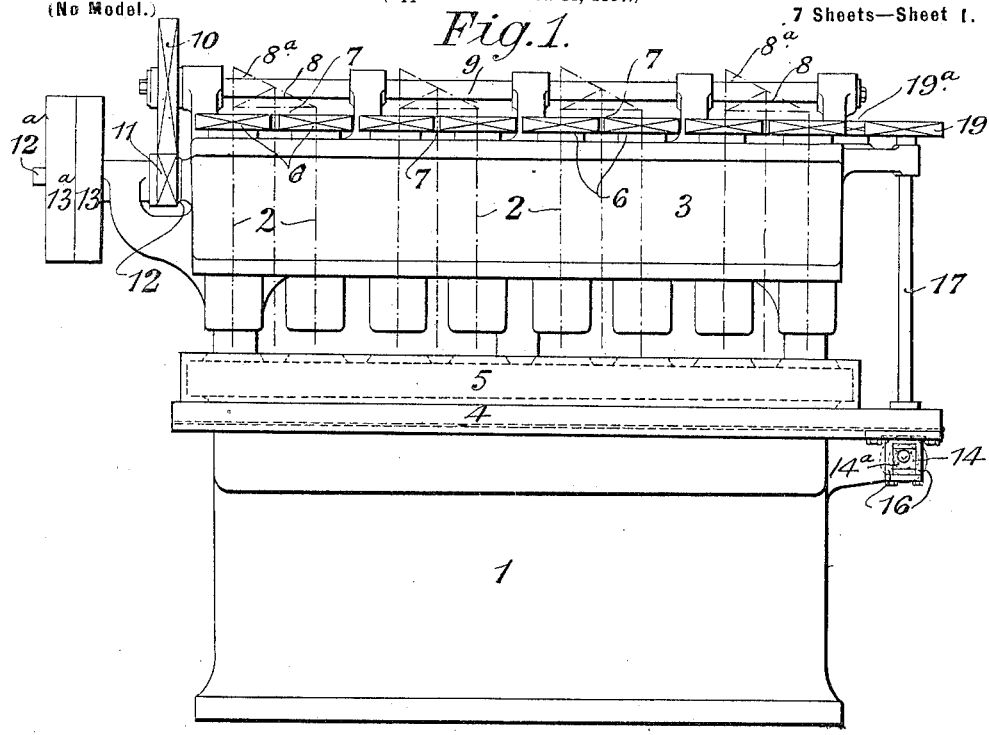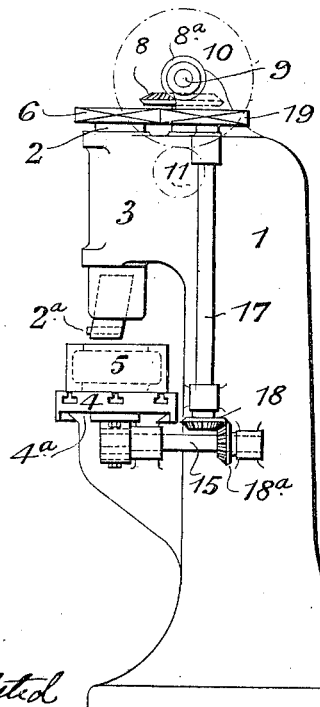

No. 659,844. Patented Oct. 16, 1900.
W. W. HULSE, Dec'd.
C. M. CATLIN, Administrator.
BORING AND TURNING MACHINE.
(Application filed Dec. 31, 1897.)
(No Model.) 7 Sheets—Sheet 2.

Witnesses:
M. C. Pinckney
Pennington Halsted

Charles M. Catlin
Administrator to the Estate
of William Wilson Hulse, deceased,
Inventor.
By J. M. Dowen
Attorney.

No. 659,844. Patented Oct. 16, 1900.
W. W. HULSE, Dec'd.
C. M. CATLIN, Administrator.
BORING AND TURNING MACHINE.
(Application filed Dec. 31, 1897.)
(No Model.) 7 Sheets—Sheet 3.

Witnesses:
W. C. Pinckney
Pennington Halsted

Charles M. Catlin
Administrator to the Estate of William Wilson Hulse deceased,
Inventor,
By J. E. M. Bowen
Attorney.

No. 659,844. Patented Oct. 16, 1900.
W. W. HULSE, Dec'd.
C. M. CATLIN, Administrator.
BORING AND TURNING MACHINE.
(Application filed Dec. 31, 1897.)
(No Model.) 7 Sheets—Sheet 4.
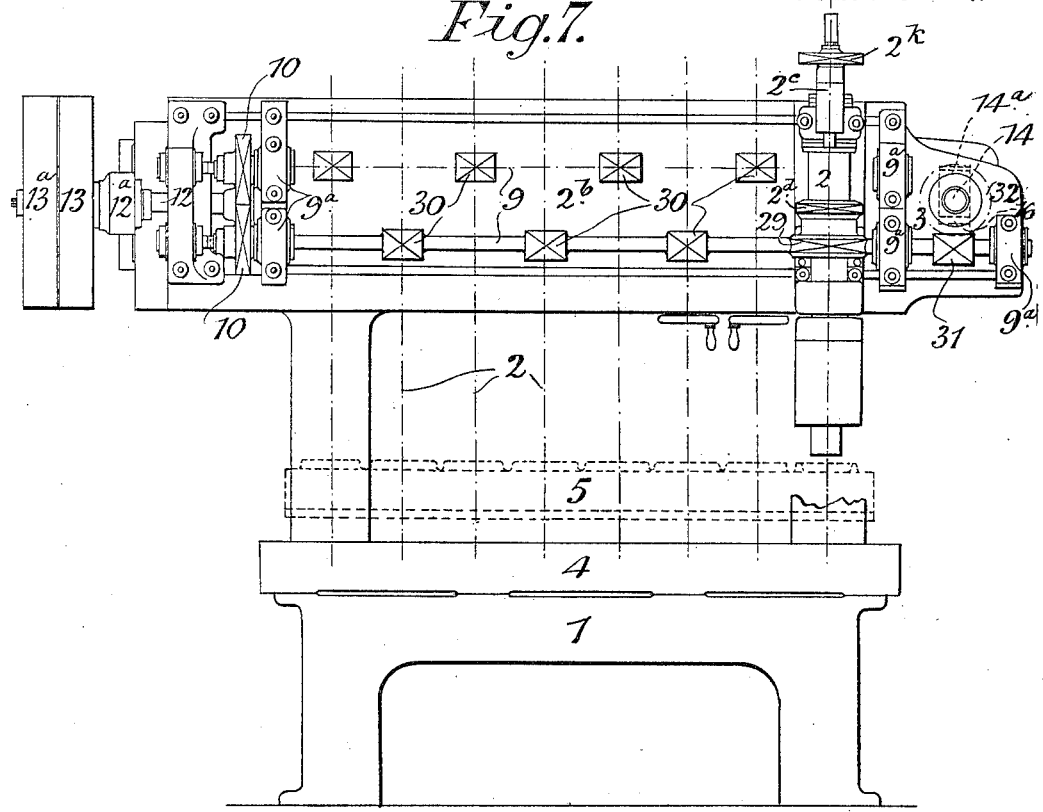
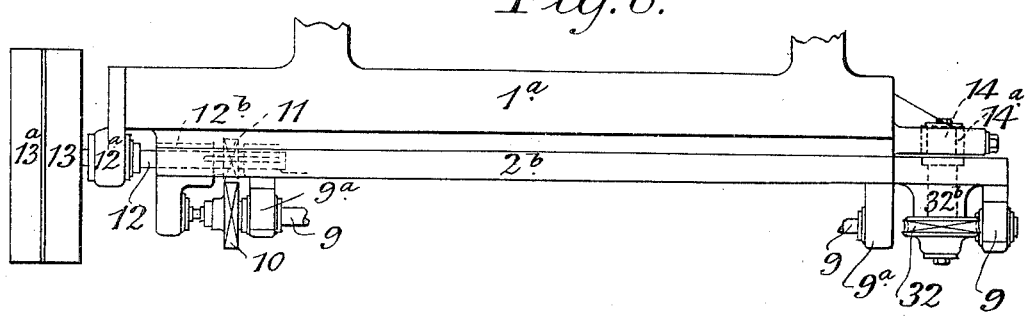

No. 659,844. Patented Oct. 16, 1900.
W. W. HULSE, Dec'd.
C. M. CATLIN, Administrator.
BORING AND TURNING MACHINE.
(Application filed Dec. 31, 1897.)
(No Model.) 7 Sheets—Sheet 5.
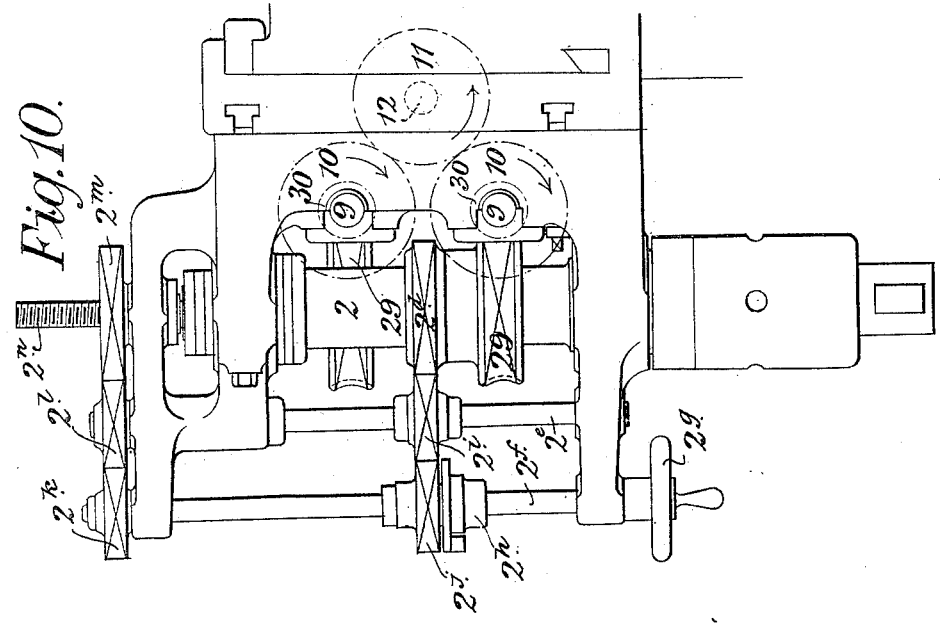
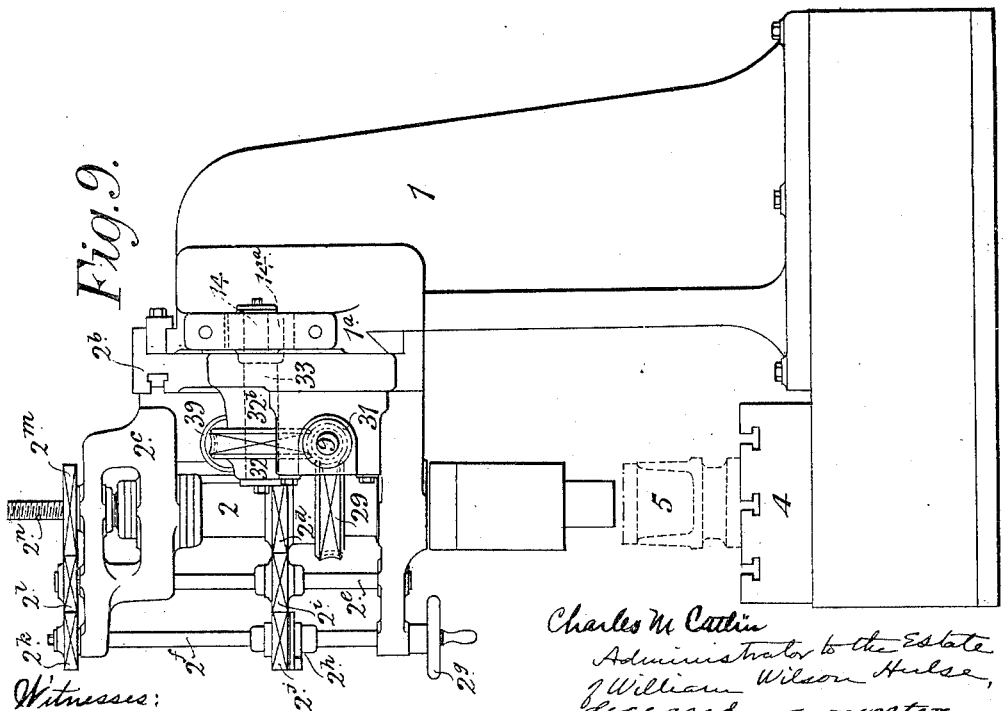

No. 659,844. Patented Oct. 16, 1900.
W. W. HULSE, Dec'd.
C. M. CATLIN, Administrator.
BORING AND TURNING MACHINE.
(Application filed Dec. 31, 1897.)
(No Model.) 7 Sheets—Sheet 6.

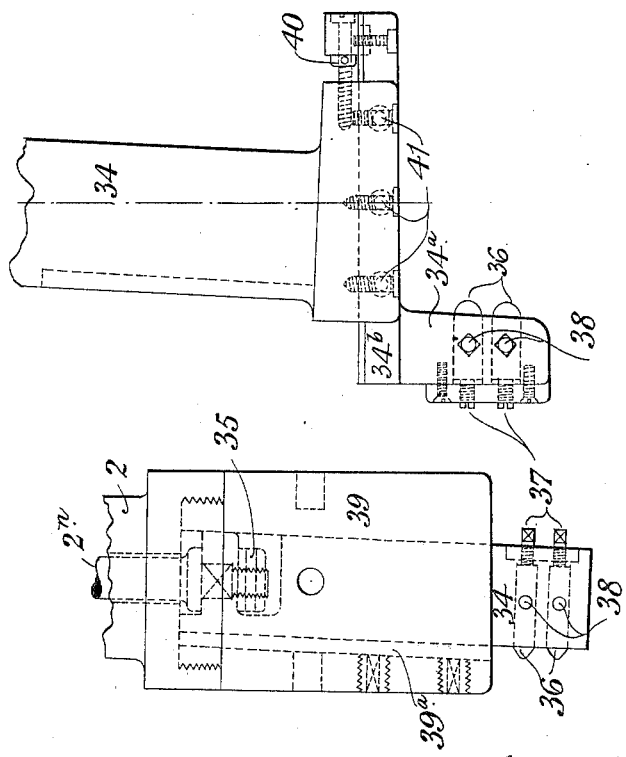

UNITED STATES PATENT OFFICE.

CHARLES M. CATLIN, OF WASHINGTON, DISTRICT OF COLUMBIA, ADMINISTRATOR OF WILLIAM WILSON HULSE, DECEASED, ASSIGNOR TO THE E. GREEN & SON, LIMITED, OF WAKEFIELD, ENGLAND.

BORING AND TURNING MACHINE.

SPECIFICATION forming part of Letters Patent No. 659,844, dated October 16, 1900.

Application filed December 31, 1897. Serial No. 665,149. (No model.)

*To all whom it may concern:*

Be it known that WILLIAM WILSON HULSE, engineer, deceased, late a subject of the Queen of Great Britain and Ireland, and a resident of Withington, in the county of Lancaster, England, (CHARLES M. CATLIN, of the city of Washington, District of Columbia, administrator,) did invent certain new and useful Improvements in Boring and Turning Machines, (for which Letters Patent were obtained in Great Britain, No. 11,696, dated June 15, 1895,) of which invention the following is a full, clear, and exact specification.

This invention has reference to multiple boring and turning machines. According thereto the frame of the machine is provided with a number of rotary spindles adapted to carry suitable cutters for operating upon the work which is secured by suitable means to a work-table arranged at right angles to the spindles and provided with means for moving it to and fro, so that a number of oval holes may be simultaneously bored in or oval parts turned upon the work. Each spindle may be driven by a toothed wheel that is fixed to it and gears with a pinion driven by means of bevel-gearing from a longitudinal shaft that is common to all the spindles and which is driven from another shaft provided with fast and loose pulleys.

The traversing mechanism for reciprocating the work-table may consist, for example, of a cam arranged to work in a slot or between projections in or carried by the work-table, or of a crank connected to the work-table by a link, such means being driven by suitable mechanism, such as shafts and bevel and spur gearing, from one of the toothed wheels on the tool-spindles or from the driving-shaft that is common to the several tool-spindles.

The machine may be constructed for boring only or for turning only, or the machine may be arranged as a combined multiple boring and turning machine, the boring-spindles being arranged along one side and the turning-spindles along the other side of the machine.

The tool-holders carried by the aforesaid spindles may be arranged for enabling articles with bevel edges to be bored or turned, suitable feeding mechanism being provided for advancing the tools relatively to the work.

Figure 4:
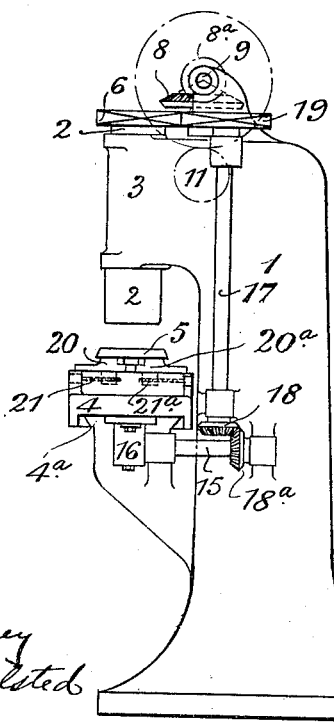
Figure 5:
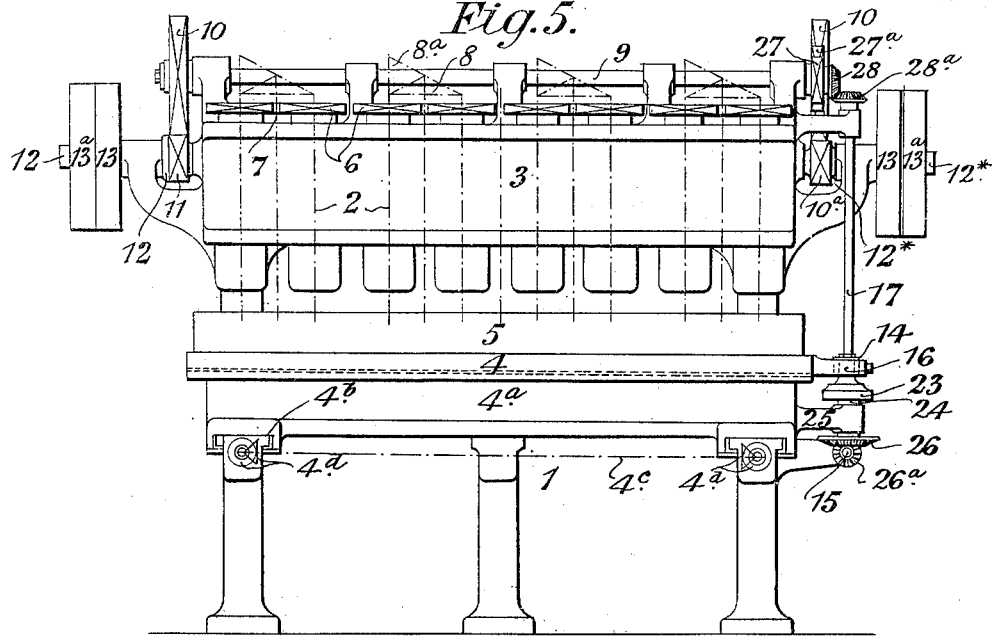
Figure 6:
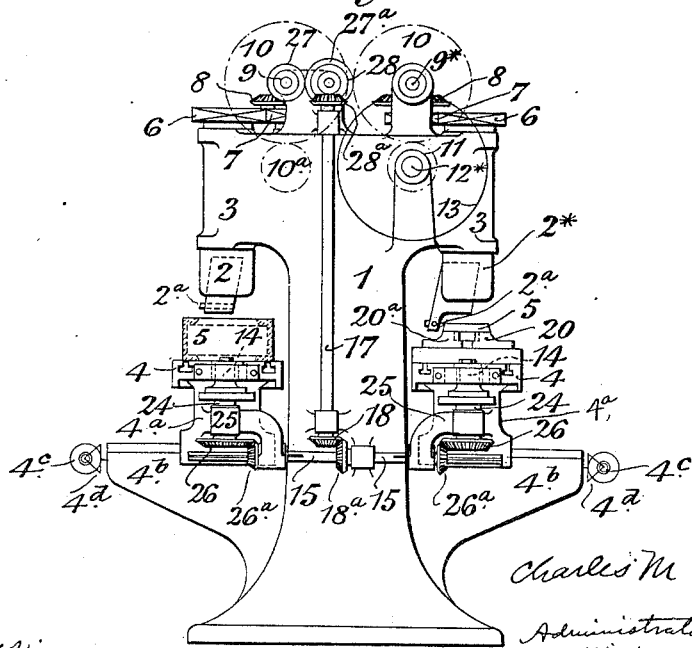
Figure 11:
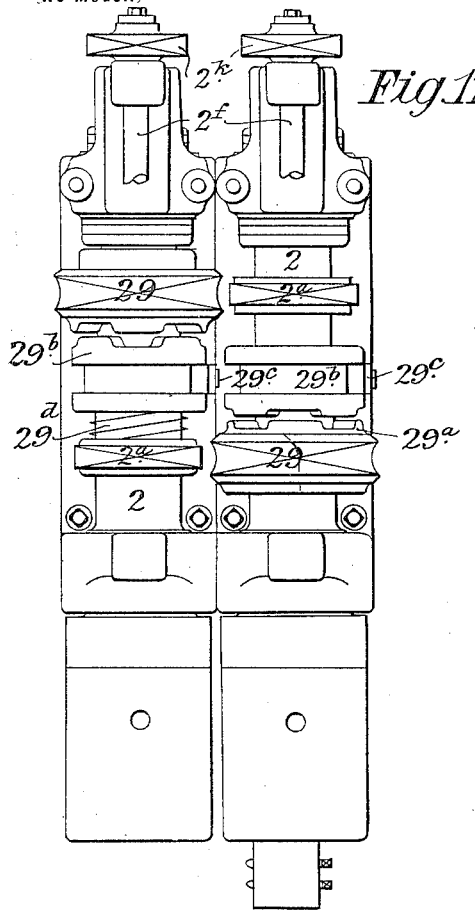
Figure 12:
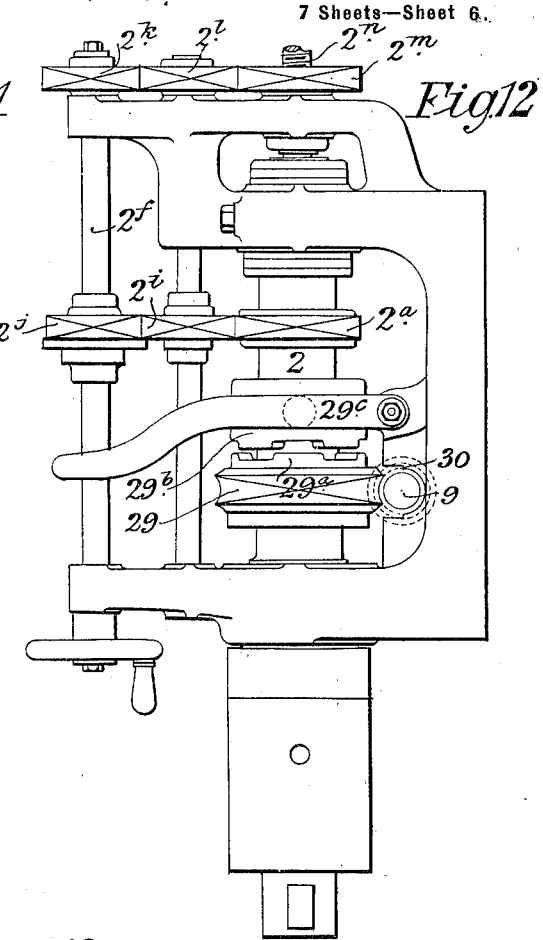
Figure 13:
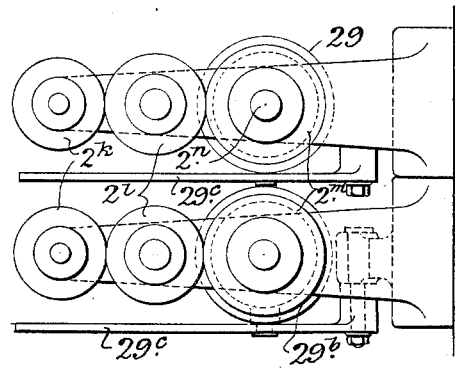

Referring to the accompanying drawings, throughout which similar parts are marked with similar reference-numerals, Figures 1 and 2 illustrate in side and end elevation, respectively, a construction of machine according to this invention for boring oval holes. Figs. 3 and 4 illustrate, respectively, in side and end elevation a machine for turning oval articles. Figs. 5 and 6 illustrate, respectively, in side elevation and in end elevation a combined boring and turning machine according to this invention. Figs. 7 to 10 show a modified construction of machine, whereby the required to-and-fro movement can be imparted to the spindle-carrier or slide instead of to the work-table, Fig. 7 being a part front elevation, Fig. 8 a part plan, Fig. 9 an end elevation corresponding thereto, and Fig. 10 and enlarged end elevation, of the spindle-carrier or slide with certain parts removed. Figs. 11, 12, and 13 illustrate, respectively, in front elevation, side elevation, and plan, a modified arrangement of head-stocks, with spindles and other parts. Fig. 14 illustrates in side elevation the lower end of a spindle carrying a tool-holder arranged for enabling articles with bevel edges to be bored. Figs. 15 and 16 illustrate a tool-holder for enabling articles with bevel edges to be turned.

Referring to Figs. 1 and 2 of the drawings, 1 is the frame of the machine, which is provided with a number of vertical spindles 2, able to rotate in bearings 3 above a work-table 4, to which the work 5 is secured it may be by T-bolts placed in grooves in the table. Each spindle is driven by a toothed wheel 6, that is fixed to its upper end, and gears with a pinion 7, mounted on a stud and driven by means of bevel-gearing 8 8$^a$ from a longitudinal shaft 9, that is common to all the spindles and which is driven through toothed wheels 10 11 from another shaft 12, mounted at one end of the frame of the machine and provided with fast and loose pulleys 13 13$^a$. Each pinion 7 gears with the toothed wheels 6 of two adjacent spindles. The traversing mechanism for reciprocating the work-table 4, which is mounted upon a slide-bed $4^a$, consists of a cam or eccentric 14, keyed upon a short shaft 15 and arranged to work between projections 16, carried by the work-table, the shaft 15 being driven by suitable mechanism—such as a shaft 17, bevel-wheels 18 $18^a$, and spur-gearing 19—from the toothed wheel 6 on the end tool-spindle. The eccentric 14 is shown encircled by a block $14^a$, which is held by but can slide up and down between the projections 16. The tool-holders carried by the spindles 2 are arranged for enabling articles with bevel edges to be bored, and suitable feeding mechanism is provided for advancing the tools $2^a$ relatively to the work.

Figs. 3 and 4 show a machine similar to that described with reference to Figs. 1 and 2, except that the spindles 2 are to be provided with turning instead of boring tools, and the work-table 4 is provided below each spindle with two sliding jaws 20 $20^a$, which can be caused to approach each other for the purpose of gripping the work or to recede from each other to release it by means of screws 21 $21^a$, or it may be by one screw with right and left hand threads.

In the combined boring and turning machine shown in Figs. 5 and 6 the boring-spindles 2 are arranged along the left-hand side, Fig. 6, and the turning-spindles $2^*$ along the other side of the machine, and the sets of spindles 2 and $2^*$ are driven from independent shafts 9 and $9^*$, actuated, respectively, from short shafts 12 $12^*$, arranged at opposite ends of the machine. The work-tables 4 are in this machine mounted upon slides $4^a$, which are adjustable transversely upon the slide-beds $4^b$, by means of a suitably-actuated longitudinal shaft $4^c$, geared by pairs of bevel-wheels $4^d$, with screws arranged in the slide-beds $4^b$. The to-and-fro movement of each of the work-tables is effected by means of a cam or eccentric 14, which is carried by a stud 24, mounted in a bracket 25, attached to the slide $4^a$, the cam being arranged to work between projections 16, carried by the work-table. The stud is driven through a bevel-wheel 26, fixed to its lower end and gearing with a bevel-pinion $26^a$, which is carried by a depending portion of the bracket 25 and which has passing through it the shaft 15, which in this case, to permit of the transverse adjustment of the slides $4^a$, is formed with a long key or feather taking into a keyway in the two bevel-pinions $26^a$, to which it is common. The shaft 17 for rotating the shaft 15 is driven from the shaft 9 through toothed wheels 27 $27^a$ and bevel-wheels 28 $28^a$.

In the modified construction shown in Figs. 7 to 10, inclusive, the frame 1 of the machine is formed at its upper part with a slide-bed $1^a$, along the front face of which there slides a T-grooved spindle-carrier or slide $2^b$, having bolted to it the vertical head-stocks $2^c$, in which the spindles 2 are mounted. The head-stocks are provided with mechanism which is operated automatically for feeding, and by hand for adjusting, the spindles 2 in the direction of their length. It comprises a spur-wheel $2^d$, fixed on the spindle 2, a fixed spindle $2^e$, a rotary spindle $2^f$, having a hand-wheel $2^g$ and a ratchet-wheel $2^h$ keyed upon it, loose spur-wheels $2^i$ and $2^j$ on the spindles $2^e$ and $2^f$, respectively, the loose spur-wheel $2^j$, having a pawl adapted to engage with the ratchet-wheel $2^h$, and spur-gear $2^k$, $2^l$, and $2^m$, the latter being in sliding but rotary connection with the feed-screw $2^n$. The spindles 2 are rotated by means of worm-wheels 29, which are fixed to them and gear with worms 30, fixed upon longitudinal shafts 9. These shafts are mounted in bearings $9^a$, carried by the slide $2^b$, and are driven through toothed wheels 10 and 11 from a shaft 12, provided with fast and loose pulleys 13 $13^a$. The shaft 12 is mounted in a bearing $12^a$, carried by the slide-bed $1^a$, and bearings or guides $12^b$ $12^b$, formed in the slide $2^b$, Fig. 8, and is connected by a feather-and-groove connection with the toothed wheel 11, which is held between the bearings or guides $12^b$ $12^b$, and slides along the shaft 12 as the slide $2^b$ is moved to and fro. In the example illustrated two shafts 9 are provided to enable the spindles 2 to be placed closer together than would otherwise be possible owing to the space required by the worm-wheels 29. Each shaft drives alternate spindles, as will be seen on reference to Fig. 7, in which only one head-stock, with spindle, &c., is shown in full, as all are alike, the positions of the remainder being indicated by center lines only, but the positions of the worms 30 on both the shafts 9 are indicated. The lower shaft 9 is extended beyond the spindles and is there provided with an additional worm 31, which gears with a worm-wheel 32, Figs. 7 and 9, keyed to the front portion of a stud 33, mounted in a long bearing $32^b$, formed in an extension of the slide $2^b$. The rear end of the stud 33 is formed with an eccentric or cam 14 and is encircled by a block $14^a$, which is arranged so that it can move vertically, but not horizontally, within a slot 16, formed in an extension of the slide-bed $1^a$, the arrangement being such that as the stud is rotated from the shaft 9, through the worm and worm-wheel 31 and 32, it will move the slide to and fro along the slide-bed, so as to cause the several tools carried by the spindles 2 to follow oval paths, and thus bore a number of oval holes in or turn oval parts upon the work, according to the class of tool with which the machine is provided.

The work to be operated upon may be bolted to a work-table 4, attached to the bed of the machine, or it may be held in position by gripping-jaws, as in the arrangements shown in Figs. 3 to 6, inclusive.

If desired, the machines may be provided with tool-holders adapted to receive at will either boring or turning tools.

The modified arrangement of head-stocks, spindles, and attached parts shown in Figs. 11, 12, and 13 is similar to that shown in Figs. 7 to 10; but each worm-wheel 29 is formed with a part clutch $29^a$, normally in engagement with a corresponding clutch-ring $29^b$, which is connected to the spindle 2 by a longitudinal feather and groove, but can be moved endwise along to the spindle and held out of engagement by means of a lever $29^c$. With this arrangement the rotation of each spindle can be independently suspended, should this become desirable from any cause. The worm-wheels 29, that gear with the worms 30 on the upper shaft 9, are arranged above the corresponding clutch-rings $29^b$, which are normally held in engagement with the worm-wheels by springs $29^d$ or other suitable means. The clutch-rings on the other spindle fall by their own weight into engagement with the corresponding worm-wheels.

To enable articles with bevel edges to be bored or turned, the lower or outer end of each spindle 2 is provided with a socket which is formed at an angle to the axis of the tool-spindle corresponding to the bevel it is required to give to the edges being operated upon, and the tool-holder, which is provided with two adjustable tools held in slots at right angles to the axis of the spindle, or approximately so, is suitably formed, so as to slide in the said socket. It will be understood that as the spindle rotates and the tool-holder is advanced by the feed-spindle, to which it is suitably attached, the cutting-faces of the tools will travel in a spiral path or an approximately-circular path which gradually increases in diameter, and will thus be caused to cut a bevel edge upon the work. Fig. 14 shows one arrangement of this kind, in which the tool-holder 34 consists of a rod formed at its upper end with slots or recesses in which the end of the feed-spindle $2^n$ is loosely connected by nuts 35 and having slots at its lower end, in which are held tools 36, that are adjusted and fixed therein by means of screws 37 and 38, respectively. The tool-holder is located within a socket $39^a$, formed in a socket-piece 39, screwed to the spindle 2, the said socket being inclined to the axis of the spindle, as shown.

In Figs. 15 and 16 the tool-holder 34, which is similar to that illustrated in Fig. 14, is formed in two parts, the tools being carried by a part $34^a$, which is formed with a dovetail portion $34^b$, adapted to slide in a corresponding groove in that part 34 of the holder which is connected to the spindle, the adjustment of the part $34^a$ being effected by means of a screw 40 and the fixing of the said part by screws 41.

What is claimed is—

1. A boring or turning machine comprising a frame provided with a bed at the front, a work-table mounted on said bed, a series of vertical cutter-spindles 2 mounted to rotate in said frame above said bed and each provided with a toothed driving-wheel, a horizontal shaft extending longitudinally of said frame and common to said spindles, means for rotating said shaft, toothed gear arranged to be operated by said shaft and in gear with the toothed wheels on said spindles, means for reciprocating said work-table and spindles relatively and at right angles to each other while said spindles are rotating to operate the cutters to work on a body on said work-table, and means for advancing the spindles in the direction of their length, substantially as described.

2. A boring or turning machine comprising a frame carrying a slide-bed, a work-table mounted to reciprocate thereon, a series of vertical rotary cutter-spindles mounted in said frame above said table, a cam adapted to reciprocate said table, a horizontal shaft common to said spindles and cam, driving mechanism between said shaft and said spindles and cam, and means for driving said shaft, substantially as described.

3. A boring and turning machine comprising a frame carrying a slide-bed, work-table mounted thereon, a series of vertical rotary cutter-spindles mounted in said frame above said table, an upper horizontal driving-shaft, mechanism for rotating said spindles from said shaft, a rotary cam adapted to reciprocate said table, a lower horizontal shaft having bearings in the frame below the work-table and from which said cam is driven, and a vertical driving-shaft in gear with the upper and lower horizontal shafts, substantially as described.

4. A multiple boring or turning machine comprising a frame, a work-table, a series of rotary tool-spindles and tools placed close together, and two shafts 9 for driving said spindles, the shafts driving alternate spindles, a cam for reciprocating the work-table, and a working connection between one shaft 9 and said cam.

5. In a boring or turning machine, the combination of a frame, a work-table common to the spindles, means for reciprocating the work-table during operation of the tools, a series of spindles and tools, a shaft with means for driving said series of spindles, and means for separately connecting and disconnecting said spindles from the driving-shafts.

Signed at the city of Washington, in the District of Columbia, this 31st day of December, 1897, in the presence of two subscribing witnesses.

CHARLES M. CATLIN,
*Administrator of the estate of William Wilson Hulse, deceased.*

Witnesses:
BENJ. R. CATLIN,
F. D. BLACKISTONE.